(12) United States Patent
Lin et al.

(10) Patent No.: US 11,752,970 B1
(45) Date of Patent: Sep. 12, 2023

(54) ONE-WAY MULTIPLE CHAMBERS AND CUSHIONS AIRBAG

(71) Applicant: GM Global Technology Operations LLC, Detroit, MI (US)

(72) Inventors: Chin-Hsu Lin, Troy, MI (US); Yi-pen Cheng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/853,091

(22) Filed: Jun. 29, 2022

(51) Int. Cl.
*B60R 21/239* (2006.01)
*B60R 21/276* (2006.01)

(52) U.S. Cl.
CPC .......... *B60R 21/239* (2013.01); *B60R 21/276* (2013.01)

(58) Field of Classification Search
None
See application file for complete search history.

(56) References Cited

U.S. PATENT DOCUMENTS

| | | | |
|---|---|---|---|
| 7,513,524 B2* | 4/2009 | Oota | B60R 21/18 280/733 |
| 8,215,665 B2* | 7/2012 | Ohara | B60R 21/2346 280/740 |
| 8,500,164 B2* | 8/2013 | Mendez | B60R 21/205 280/739 |
| 9,815,428 B2* | 11/2017 | Anderson | B60R 21/2338 |
| 9,821,751 B2* | 11/2017 | Pendse | B60R 21/233 |
| 10,369,956 B2* | 8/2019 | Deng | B60R 21/207 |
| 2012/0126518 A1 | 5/2012 | Fukawatase | |
| 2014/0375032 A1 | 12/2014 | Fukawatase et al. | |
| 2015/0035264 A1* | 2/2015 | Anderson | B60R 21/26 280/736 |

FOREIGN PATENT DOCUMENTS

| | | | | |
|---|---|---|---|---|
| CN | 105934369 A | * | 9/2016 | .......... B60R 21/233 |
| CN | 108275110 A | * | 7/2018 | .......... B60R 21/203 |
| DE | 10021576 A1 | | 11/2000 | |
| DE | 102014217808 A1 | | 3/2015 | |
| DE | 102016212433 A1 | * | 1/2017 | .......... B60R 21/233 |
| JP | 2008149965 A | * | 7/2008 | |
| JP | 2018111373 A | | 7/2018 | |
| KR | 20100132731 A | * | 12/2010 | .......... B60R 21/233 |
| KR | 101595346 B1 | | 2/2016 | |

* cited by examiner

*Primary Examiner* — Faye M Fleming
(74) *Attorney, Agent, or Firm* — Vivacqua Crane PLLC (57) ABSTRACT

A one-way multiple cushions and chambers vehicle airbag assembly includes an airbag body having a primary airbag chamber and a secondary airbag chamber. At least one one-way vent valve provides a gas interconnection passage between the primary airbag chamber and the secondary airbag chamber.

19 Claims, 7 Drawing Sheets

ONE-WAY MULTIPLE CHAMBERS AND CUSHIONS AIRBAG

INTRODUCTION

The present disclosure relates to vehicle airbags.

Current vehicle designs provide airbags in multiple locations to provide additional protection of vehicle occupants during collision events. An airbag is a vehicle occupant-restraint system using a bag designed to inflate quickly, then deflate. Airbags commonly consist of an airbag cushion, a flexible fabric bag, an inflation module, and an impact sensor. The airbag provides an energy-absorbing surface between a vehicle occupant and objects including a steering wheel, an instrument panel, a body pillar, a headliner, and a windshield. Modern vehicles may contain up to 10 airbag modules in various configurations, including: driver, passenger, side-curtain, seat-mounted, door-mounted, B-pillar and C-pillar mounted side-impact, knee bolster, inflatable seat belt, and pedestrian airbag modules. During a collision event, vehicle sensors provide information to an airbag electronic controller unit (ECU). Firing circuits controlled by the ECU deploy one or more airbag modules within the vehicle. Airbags act as a supplemental restraint system to the vehicle's seat-belt systems, and airbag module deployments are commonly triggered through a pyrotechnic process.

While current vehicle airbag assemblies achieve their intended purpose, there is a need for a new and improved vehicle airbag assembly.

SUMMARY

According to several aspects, a one-way multiple cushions and chambers vehicle airbag assembly includes an airbag body having a primary airbag chamber and a secondary airbag chamber. At least one one-way vent valve provides a gas interconnection passage between the primary airbag chamber and the secondary airbag chamber.

In another aspect of the present disclosure, a connecting wall is positioned between and separates the primary airbag chamber and the secondary airbag chamber. The connecting wall defines a substantially impermeable barrier to gas transfer between the secondary airbag chamber and the primary airbag chamber when the airbag is inflated during an airbag deployment event.

In another aspect of the present disclosure, the at least one one-way vent valve extends through the connecting wall.

In another aspect of the present disclosure, when fully inflated with a gas during the airbag deployment event the secondary airbag chamber defines a supplementary cushion volume bounded between the connecting wall and an outer occupant facing wall.

In another aspect of the present disclosure, the at least one one-way vent valve penetrates the connecting wall allowing a first portion of a gas filling the airbag body during the deployment event to be directed from the primary airbag chamber into the secondary airbag chamber.

In another aspect of the present disclosure, the at least one one-way vent valve penetrates the connecting wall allowing a first portion of a gas filling the airbag body during the deployment event to be directed from the secondary airbag chamber into the primary airbag chamber.

In another aspect of the present disclosure, the at least one one-way valve includes a first one-way vent valve and a second one-way vent valve individually having a stitched border providing stiffness to maintain an opening port to allow gas flow through the first one-way vent valve and the second one-way vent valve during deflation of the airbag body.

In another aspect of the present disclosure, the primary airbag chamber includes a first chamber portion and a second chamber portion in open fluid communication.

In another aspect of the present disclosure, a tether is positioned between the first chamber portion and the second chamber portion, and the first chamber portion and the second chamber portion together define the primary airbag chamber.

In another aspect of the present disclosure, a vent hole is positioned in the primary airbag chamber to vent the primary airbag chamber to atmosphere following an airbag deployment event.

According to several aspects, a one-way multiple cushions and chambers vehicle airbag assembly includes an airbag body having a primary airbag chamber and a secondary airbag chamber. The airbag body is connected to a source of a gas used to inflate the airbag body during an airbag deployment event. A connecting wall is positioned between the primary airbag chamber and the secondary airbag chamber. First and second one-way vent valves penetrate the connecting wall and individually provide a gas interconnection passage between the primary airbag chamber and the secondary airbag chamber allowing a primary flow of the gas from one of the primary airbag chamber and the secondary airbag chamber into the other one of the primary airbag chamber and the secondary airbag chamber during the airbag deployment event.

In another aspect of the present disclosure, the connecting wall defines a substantially impermeable barrier to gas transfer between the secondary airbag chamber and the primary airbag chamber.

In another aspect of the present disclosure, the first one-way vent valve and the second one-way vent valve do not preclude but restrict a reverse flow of the gas back into the primary airbag chamber, allowing the secondary airbag chamber to deflate after the airbag deployment event slower than a deflation rate of the primary airbag chamber.

In another aspect of the present disclosure, the connecting wall defines an outer face of the primary airbag chamber.

In another aspect of the present disclosure, the connecting wall defines an outer face of the secondary airbag chamber.

In another aspect of the present disclosure, the first and second one-way vent valves individually include: a first edge wall having a first wall thickness; a second edge wall oppositely positioned with respect to the first edge wall having a second wall thickness greater than the first wall thickness to permit the first edge wall to collapse more easily than the second edge wall; and a first height of the first edge wall being shorter than a second height of the second edge wall edge to control a collapse direction of the first and second one-way vent valves.

In another aspect of the present disclosure, the first and second one-way vent valves individually include: opposing wall edges having an equal thickness; and an opening port having a stitched border providing stiffness to maintain the opening port open during collapse of the first and second one-way vent valves when the airbag body deflates.

According to several aspects, a method for inflating multiple cushions and chambers of a vehicle airbag assembly, comprises: positioning a connecting wall between a primary airbag chamber and a secondary airbag chamber of an airbag body; directing one of the primary airbag chamber and the secondary airbag chamber toward an occupant of a vehicle during inflation of the airbag body with a gas during an airbag deployment event; and extending first and second one-way vent valves through the connecting wall to individually provide a gas interconnection passage between the primary airbag chamber and the secondary airbag chamber allowing a primary flow of the gas from one of the primary airbag chamber and the secondary airbag chamber into the other one of the primary airbag chamber and the secondary airbag chamber during the airbag deployment event.

In another aspect of the present disclosure, the method further includes: configuring the airbag body having the secondary airbag chamber directed toward the occupant of the vehicle during inflation of the airbag body to use the secondary airbag chamber as a cushion for a head of the occupant; and selectively arranging the primary flow of the gas from the primary airbag chamber into the secondary airbag chamber to permit the secondary chamber to deflate slower than the primary airbag chamber to maintain at least a portion of the cushion to remain between the head of the occupant an structure of the vehicle.

In another aspect of the present disclosure, the method further includes: configuring the airbag body having the primary airbag chamber directed toward the occupant of the vehicle during inflation of the airbag body to allow the primary airbag chamber to be first contacted by a head of the occupant; and selectively arranging the primary flow of the gas from the secondary airbag chamber into the primary airbag chamber having the secondary airbag chamber deflating slower than the primary airbag chamber to maintain at least a portion of the secondary airbag chamber to remain between the head of the occupant and a structure of the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
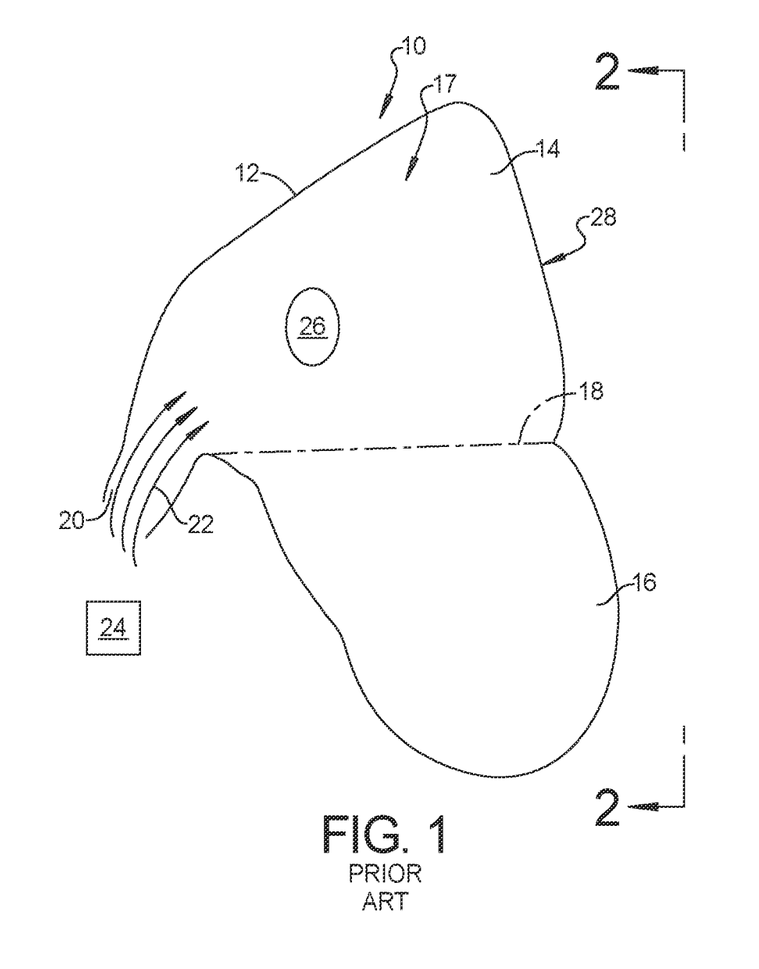
FIG. 1 is a side elevational view of a known airbag assembly.

Referring to FIG. 1, a known airbag assembly 10 includes an airbag body 12 having a first portion 14 and a second portion 16 which together define a single airbag chamber 17 having a tether 18 centrally disposed through the airbag chamber 17. The first portion 14 and the second portion 16 are in open fluid communication such that the tether 18 does not act as a fluid boundary between the first portion 14 and the second portion 16, but acts to internally structurally stiffen the airbag body 12 when the airbag body 12 is fully inflated as shown. A gas fill inlet 20 opens into the airbag body 12 supplying a flow of a gas 22 under pressure used to fill the airbag body 12 as is known. The gas 22 is supplied from a gas generator such as a pyrotechnic device 24 located adjacent to and outside of the airbag body 12.

Airbag assembly deployment is commonly controlled by an airbag electronic controller unit (ECU), which incorporates a collision type, a collision angle, and a severity of impact to determine when and if to deploy the airbag assembly. An airbag ECU's crash algorithm determines if the crash event meets the criteria for deployment and triggers various firing circuits to deploy one or more airbag assemblies, Airbag assembly deployments are commonly triggered through the pyrotechnic device 24 which releases the gas 22 into the airbag body 12. The airbag body 12 deflates following a collision event by allowing the gas 22 to flow outwardly from the airbag chamber 17 of the airbag body 12 through a vent hole 26. The vent hole 26 is sized to allow deflation of the airbag body 12.

Referring to FIG. 2 and again to FIG. 1, the known airbag assembly 10 is shown positioned within a vehicle 28 such as an automobile vehicle and following a collision event sufficient to trigger airbag deployment. An occupant torso 30 of a vehicle occupant is restrained by seatbelts to a vehicle seat 32 allowing rotation of the occupant torso 30 and an occupant head 34 about an arc of rotation 36 during the collision event. A forward-facing surface 38 of the occupant head 34 contacts an outer surface 40 of the airbag body 12 which locally compresses the airbag chamber 17 at a chamber region 42 of the airbag body 12. Under certain conditions of occupant acceleration, the airbag chamber 17 expands outwardly allowing total or near-total compression of the chamber region 42 permitting the occupant head 34 to contact for example a vehicle object 44 such as a glove box shown, a steering wheel, or other vehicle structure, with the material of the outer surface 40 positioned between the occupant head 34 and the object 44.

Figure 2:
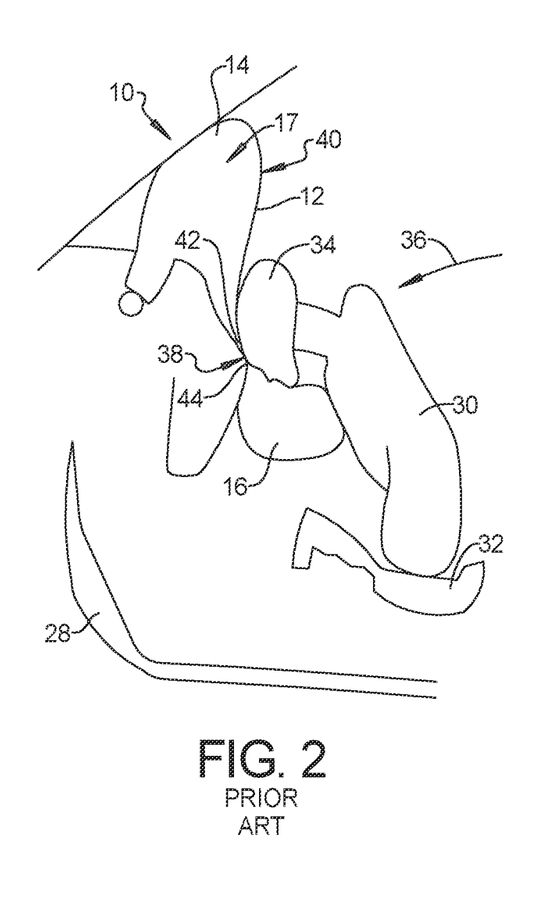
FIG. 2 is a partial cross-sectional side elevational view of the airbag assembly of FIG. 1 taken at section 2 of FIG. 1 during an airbag deployment event.

Referring to FIG. 3A and again to FIGS. 1 and 2, according to the present disclosure a one-way multiple cushions and chambers airbag assembly 45 may include the gas generator such as the pyrotechnic device 24' fixed to and in communication with a connecting chamber 46. The connecting chamber 46 may be fixed to a mounting connector 47 which couples the connecting chamber 46 to a gas fill inlet 48.

Figure 3A:
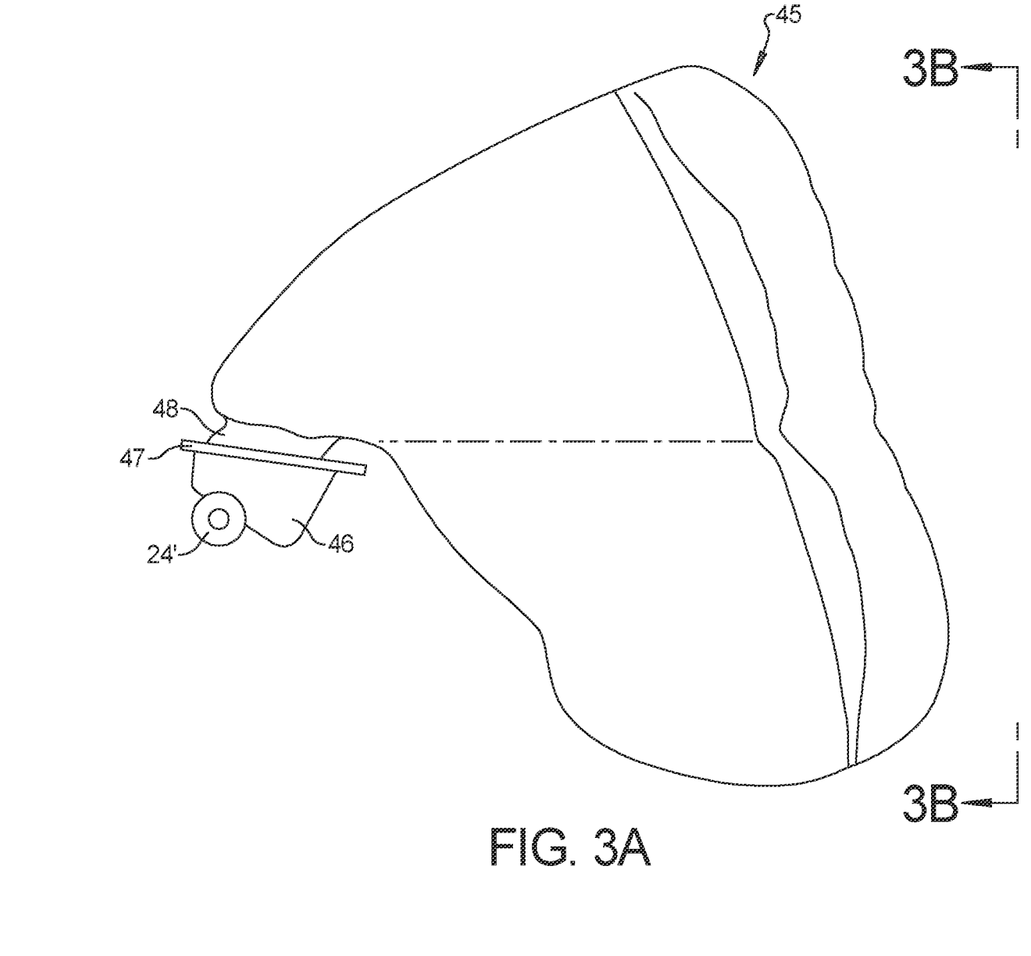
FIG. 3A is a side elevational view of an airbag assembly according to an exemplary aspect.

Referring to FIG. 3B and again to FIGS. 1, 2 and 3A, the one-way multiple cushions and chambers airbag assembly 45 is provided to mitigate against an airbag single chamber collapse possible with the airbag assembly 10 described in reference to FIGS. 1 and 2. It is noted components of the one-way multiple cushions and chambers airbag assembly 45 having the same or similar components as the airbag assembly 10 are denoted with an apostrophe symbol. The one-way multiple cushions and chambers airbag assembly 45 includes an airbag body 49 having a first chamber portion 50 and a second chamber portion 52. The first chamber portion 50 and the second chamber portion 52 together define a first or primary airbag chamber 54. A tether 56 is substantially centrally positioned within the airbag body 49 and may be fixed at a connecting end 58 to the gas fill inlet. The first chamber portion 50 and the second chamber portion 52 are in fluid communication as the tether 56 acts to internally structurally stiffen the airbag body 12 when the airbag body 12 is fully inflated as shown and provides substantially no separation of the gas in the first chamber portion 50 and the second chamber portion 52 when the airbag body 49 is fully inflated as shown.

Figure 3B:
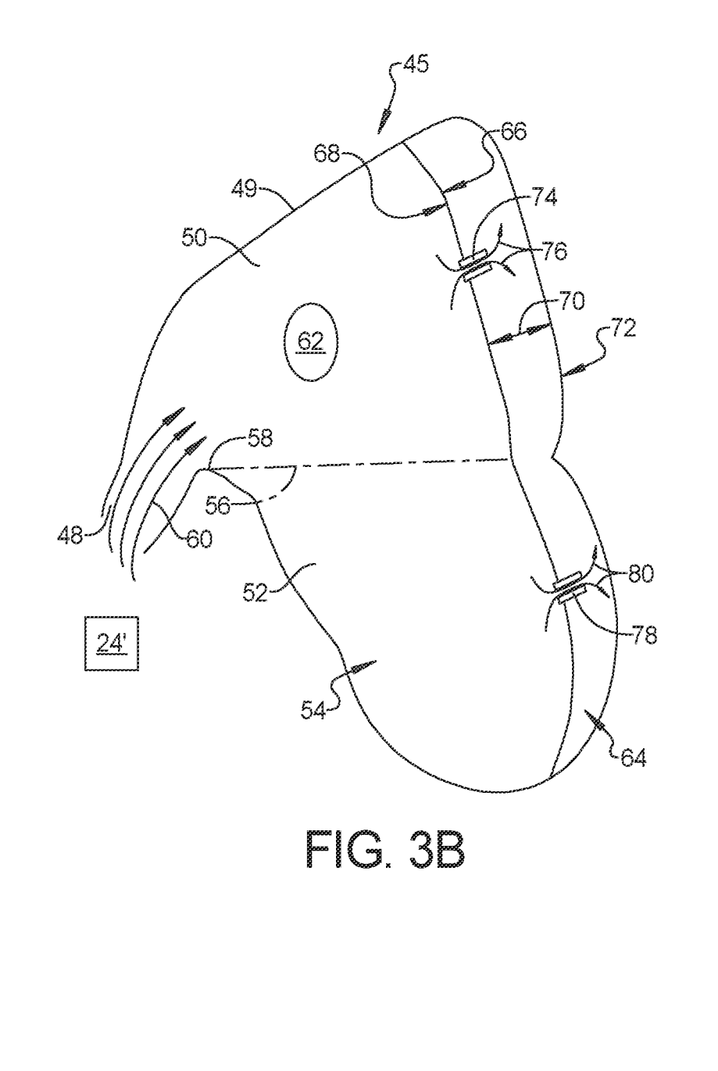
FIG. 3B is a cross-sectional side elevational view taken at section 3B of FIG. 3A.

The gas fill inlet 48 opens into the airbag body 49 supplying a flow of a gas 60 under pressure used to fill the airbag body 49 as is known. The gas 60 is supplied from a gas generator such as a pyrotechnic device 24' located adjacent to and outside of the airbag body 49. Airbag assembly deployments are commonly triggered through the pyrotechnic device 24' which releases the gas 60 into the airbag body 49. The airbag body 49 deflates following a collision event by allowing the gas 60 to flow outwardly from the primary airbag chamber 54 through a vent hole 62. The vent hole 62 is sized to allow deflation of the airbag body 49 to atmosphere following full deployment of the airbag body 49 following the airbag deployment event.

In addition to the primary airbag chamber 54, the airbag body 49 further includes a secondary airbag chamber 64. A connecting wall 66 of the secondary airbag chamber 64 creates an outer face 68 of the primary airbag chamber 54 with the connecting wall 66 defining a substantially impermeable barrier to gas transfer between the secondary airbag chamber 64 and the primary airbag chamber 54 with the exception of the one-way vent valves noted below. When fully inflated the secondary airbag chamber 64 defines a supplementary cushion volume 70 bounded between the connecting wall 66 and an outer occupant facing wall 72.

Figure 9:
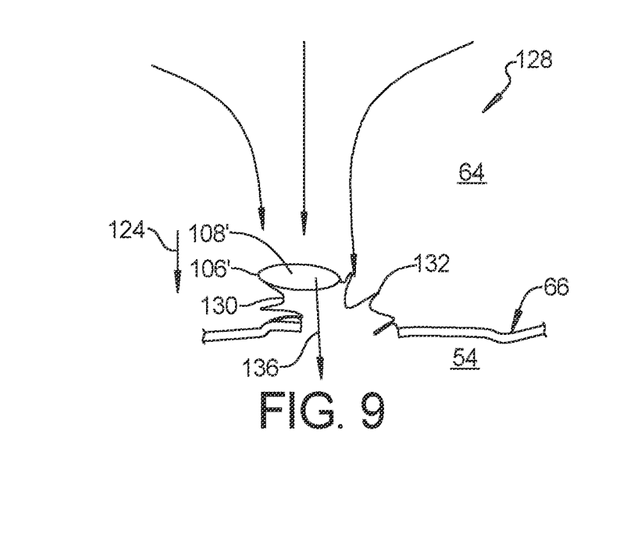
FIG. 9 is a cross-sectional elevational view of the one-way vent valve of FIG. 8 during airbag discharge.

The secondary airbag chamber 64 is inflated in conjunction with and substantially simultaneously during filling the primary airbag chamber 54. As the gas 60 enters the primary airbag chamber 54 the gas 60 flows toward the outer face 68 of the airbag body 49 and enters a first one-way vent valve 74 which penetrates the connecting wall 66 allowing a first portion of the gas 60 as a gas flow 76 into the secondary airbag chamber 64. According to several aspects a second one-way vent valve 78 also penetrates the outer face 68 allowing a second portion of the gas 60 as a gas flow 80 to enter the secondary airbag chamber 64. The first one-way vent valve 74 and the second one-way vent valve 78 individually provide a gas interconnection passage between the primary airbag chamber 54 and the secondary airbag chamber 64. According to several embodiments additional one-way valves may also be used as determined by the airbag body 49 volume and fill time requirements. The first one-way vent valve 74 and the second one-way vent valve 78 do not preclude but restrict reverse flow of the gas 60 back into the primary airbag chamber 54, allowing the secondary airbag chamber 64 to slowly empty after deployment of the one-way multiple cushions and chambers airbag assembly 45 as discussed in reference to FIGS. 7 and 9 below.

Referring to FIG. 4 and again to FIGS. 2 and 3B, during an airbag deployment event the occupant torso 30' of the vehicle occupant is restrained by seatbelts to the vehicle seat 32' allowing rotation of the occupant torso 30' and the occupant head 34' about the arc of rotation 36' during the collision event. The forward-facing surface 38' of the occupant head 34' initially contacts the outer occupant facing wall 72 of the secondary airbag chamber 64 which locally partially compresses the secondary airbag chamber 64. Under certain conditions of occupant acceleration the primary airbag chamber 54 expands outwardly allowing total or near-total compression of the chamber region 42 shown in reference to FIG. 2. Because the gas 60 is temporarily trapped in the secondary airbag chamber 64 by the first one-way vent valve 74 and the second one-way vent valve 78, the secondary airbag chamber 64 does not collapse and continues to support the occupant head 34' in a chamber region 82 of the secondary airbag chamber 64 such that the occupant head 34' is precluded from contacting the vehicle object 44'. The chamber region 82 is gas filled and provides a clearance gap 84 between the forward-facing surface 38' of the occupant head 34' and the object 44'.

Figure 4:
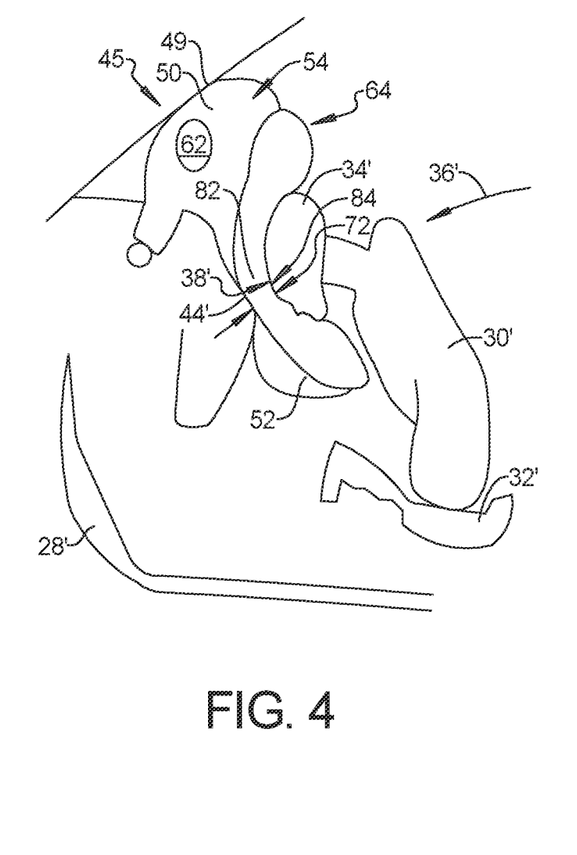
FIG. 4 is a is a cross-sectional side elevational view modified from FIG. 3B to further include an occupant during an airbag deployment event.
Figure 5:
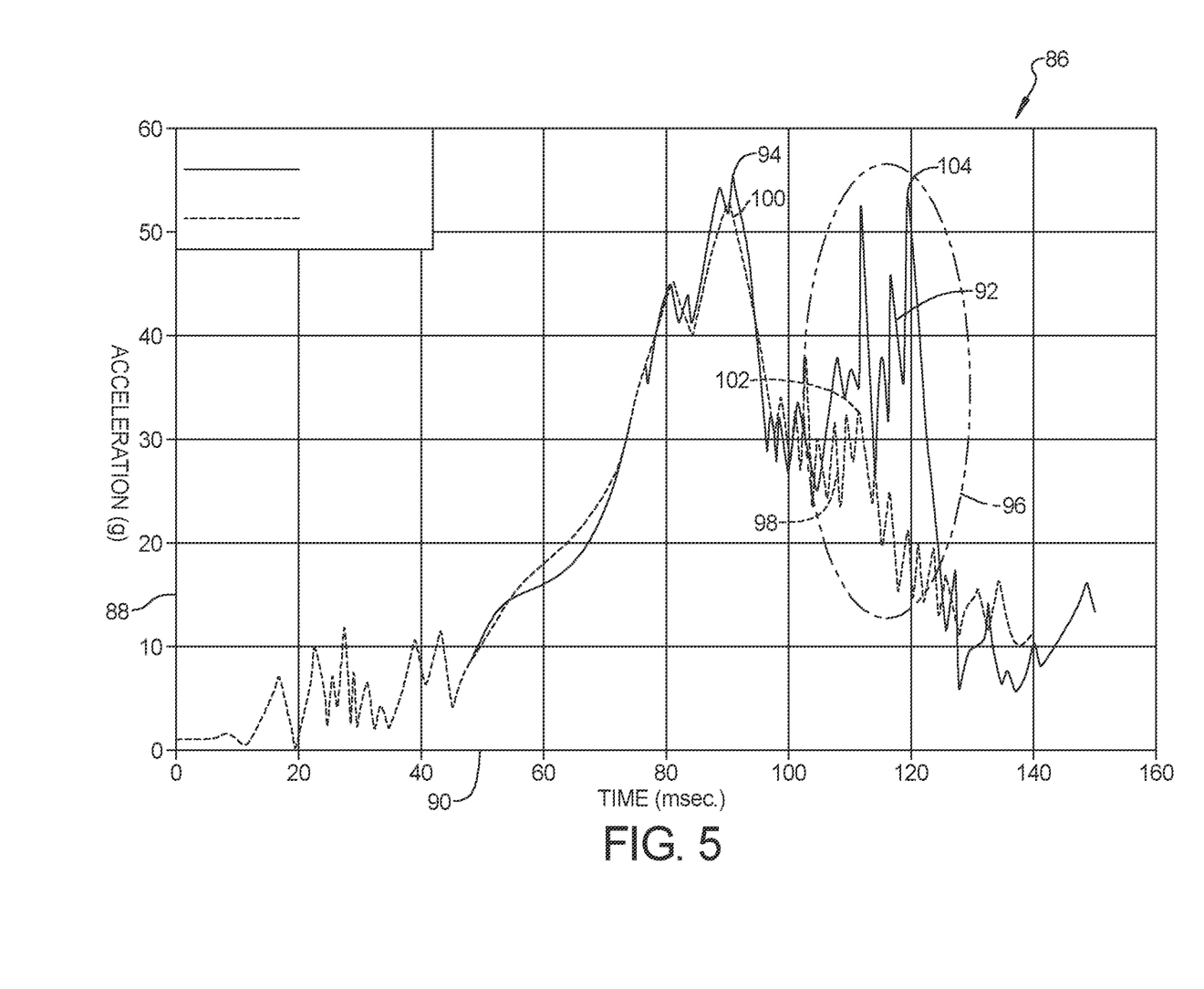
FIG. 5 is a graph of occupant head acceleration using the airbag assembly of FIG. 3A compared to occupant head acceleration using the known airbag assembly of FIG. 1.

Referring to FIG. 5 and again to FIGS. 3B and 4, a graph 86 presents an occupant acceleration 88 (g) compared to a time 90 (msec) during an exemplary airbag deployment event. A base curve 92 represents an occupant displacement over time for the airbag assembly 45 having a maximum acceleration 94 occurring at approximately 90 msec after initiation of the event. An acceleration region 96 presents subsequent accelerations of the occupant head 34' less than the maximum acceleration 94 between approximately 110 msec and 125 msec as the occupant head 34' compresses the single airbag chamber 17. A region-of-interest (ROI) curve 98 presents exemplary occupant head 34' acceleration over time resisted by the one-way multiple cushions and chambers airbag assembly 45 of the present disclosure. The ROI curve 98 identifies the occupant head 34' has a peak acceleration 100 less than the maximum acceleration 94. The portion of the ROI curve 98 proximate to the acceleration region 96 also presents substantially reduced occupant head 34' acceleration levels, having a secondary peak acceleration 102 of approximately 33 g compared to a secondary maximum acceleration 104 of approximately 54 g when the airbag assembly 10 is employed to resist occupant acceleration.

Referring to FIG. 6 and again to FIG. 3B, the first one-way vent valve 74 is shown in greater detail in a fully extended position during inflation of the one-way multiple cushions and chambers airbag assembly 45. The first one-way vent valve 74 penetrates the connecting wall 66 allowing the first portion of the gas 60 as the gas flow 76 to flow from the primary airbag chamber 54 into the secondary airbag chamber 64. The second one-way vent valve 78 shown in reference to FIG. 3B is similar to the first one-way vent valve 74 and is therefore not further shown or discussed herein. A stitched border 106 provides stiffness to maintain an opening port 108 defining a gas interconnection passage which allows gas flow through the first one-way vent valve 74. A first edge wall 110 of the first one-way vent valve 74 has a first wall thickness 112. A second edge wall 114 the first one-way vent valve 74 oppositely positioned with respect to the first edge wall 110 has a second wall thickness 116 greater than the first wall thickness 112 to permit the first edge wall 110 to collapse more easily than the second edge wall 114. A first height 118 of the first edge wall 110 is shorter than a second height 120 of the second edge wall 114 to control a collapse direction of the first one-way vent valve 74.

Figure 6:
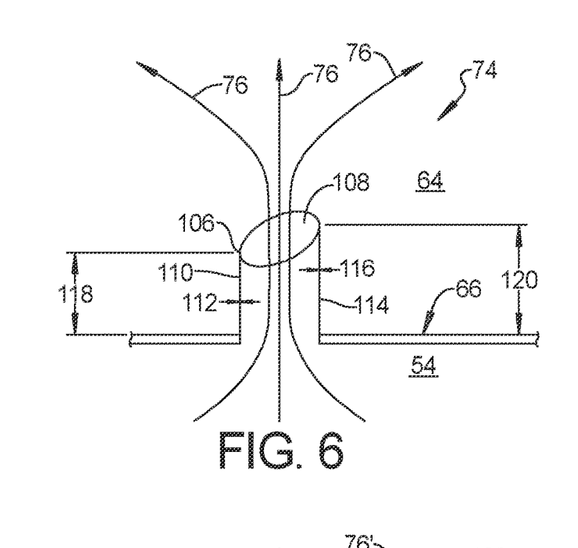
FIG. 6 is a cross-sectional elevational view of the first one-way vent valve of FIG. 3B during airbag fill.

The gas interconnection passage between the primary airbag chamber 54 and the secondary airbag chamber 64 allows the gas flow 76 and the primary flow 80 of the gas 60 from the primary airbag chamber 54 into the secondary airbag chamber 64 during the airbag deployment event. The first one-way vent valve 74 and the second one-way vent valve 78 do not preclude but restrict a reverse flow of the gas 60 back into the primary airbag chamber 54, allowing the secondary airbag chamber 64 to empty after the airbag deployment event slower than a deflation rate of the primary airbag chamber 54, thereby maintaining the cushion of the secondary airbag chamber 64 longer during the deployment event.

Referring to FIG. 7 and again to FIG. 6, the first one-way vent valve 74 is shown during venting of the secondary airbag chamber 64 back into the primary airbag chamber 54 following airbag deployment. Because the second wall thickness 116 is greater than the first wall thickness 112 the first one-way vent valve 74 collapses initially in a direction 122 opposite to the second edge wall 114 and thereafter in a direction 124 toward the connecting wall 66. As noted above, the stitched border 106 provides stiffness to maintain the opening port 108 open during vent valve collapse. A restricted gas flow is thereby allowed in a gas flow direction 126 through the first one-way vent valve 74 from the secondary airbag chamber 64 back into the primary airbag chamber 54.

Figure 7:
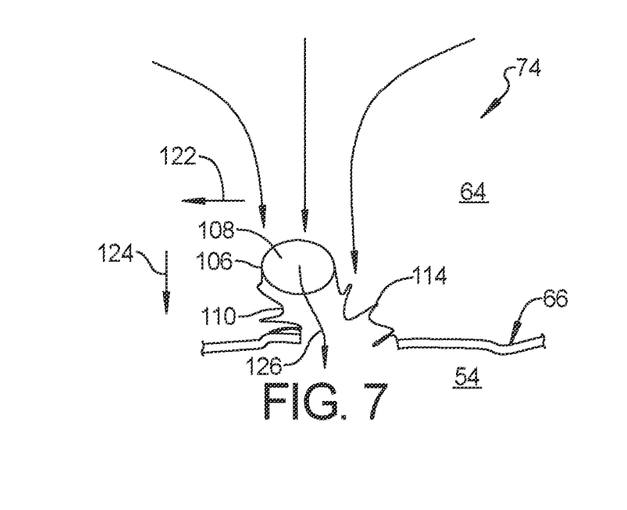
FIG. 7 is a cross-sectional elevational view of the first one-way vent valve of FIG. 3B during airbag discharge.

Referring to FIG. 8 and again to FIGS. 6 and 7, according to further aspects, a third one-way vent valve 128 may be used in place of either or both of the first one-way vent valve 74 and the second one-way vent valve 78. The third one-way vent valve 128 is shown during venting of the secondary airbag chamber 64 back into the primary airbag chamber 54 following airbag deployment. A third edge wall 130 and an opposed fourth edge wall 132 have an equal or common third wall thickness 134.

Figure 8:
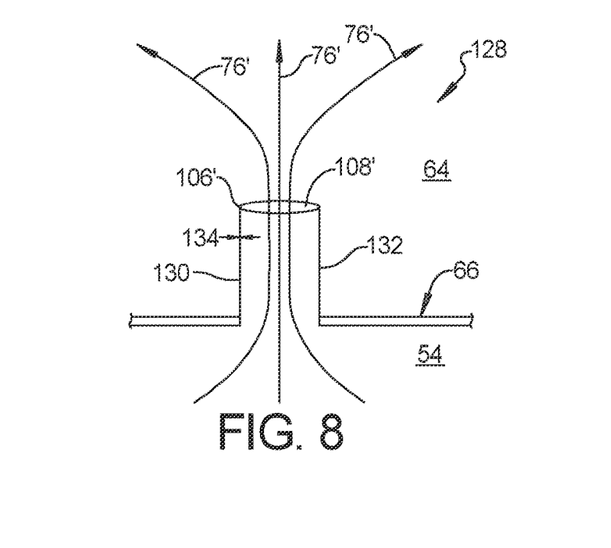
FIG. 8 is a cross-sectional elevational view of another aspect of a one-way vent valve during airbag fill.

Referring to FIG. 9 and again to FIG. 8, due to the common third wall thickness 134 of the third edge wall 130 and the fourth edge wall 132, the third one-way vent valve 128 collapses substantially in the direction 124' toward the connecting wall 66. As noted above, the stitched border 106' provides stiffness to maintain the opening port 108' open during vent valve collapse. A restricted gas flow is thereby allowed in a gas flow direction 136 through the third one-way vent valve 128 from the secondary airbag chamber 64 back into the primary airbag chamber 54 which may take a less circuitous route than the flow direction 126 discussed in reference to FIG. 7.

Referring to FIG. 10 and again to FIGS. 3B and 4, an occupant 142 representing a 5th percentile occupant by weight is shown at approximately 50 msec into an airbag deployment event. An occupant head 144 of the occupant 142 initially contacts the outer occupant facing wall 72 of the secondary airbag chamber 64. At this time the primary airbag chamber 54 is substantially unchanged from the fully inflated position shown in FIG. 3B.

Figure 10:
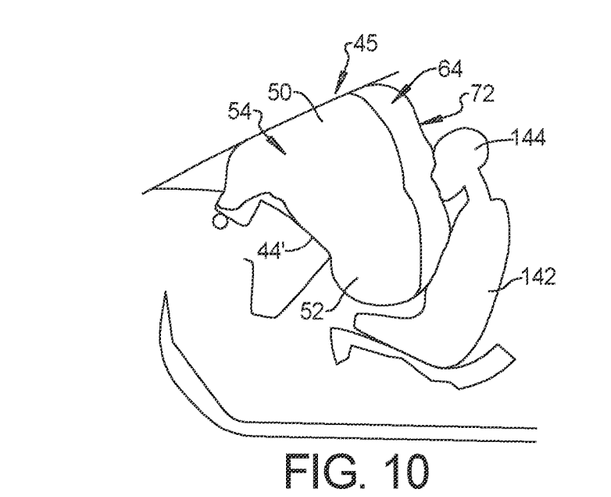
FIG. 10 is a cross-sectional side elevational view modified from FIG. 3B to further include a 5th percentile occupant at 50 msec into an airbag deployment event.
Figure 11:
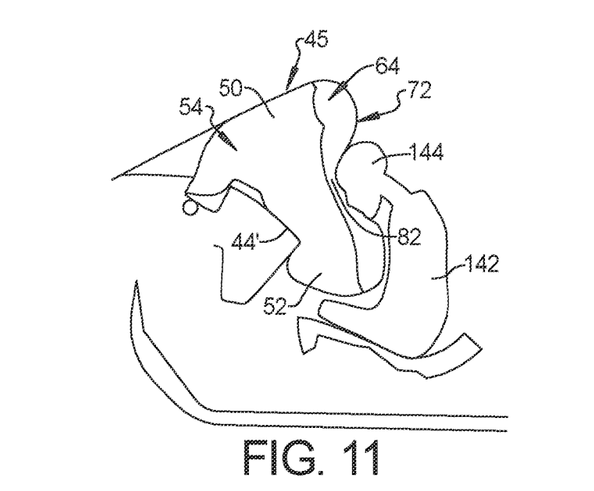
FIG. 11 is a cross-sectional side elevational view modified from FIG. 10 to include the 5th percentile occupant at 80 msec into the airbag deployment event.

Referring to FIG. 11 and again to FIGS. 3B, 4 and 10, the occupant 142 is shown at approximately 80 msec into the airbag deployment event. The occupant head 144 has partially collapsed the secondary airbag chamber 64 approximately retaining the chamber region 82 of the secondary airbag chamber 64. The primary airbag chamber 54 has partially collapsed but the occupant head 144 is entirely clear of the object 44'.

Figure 12:
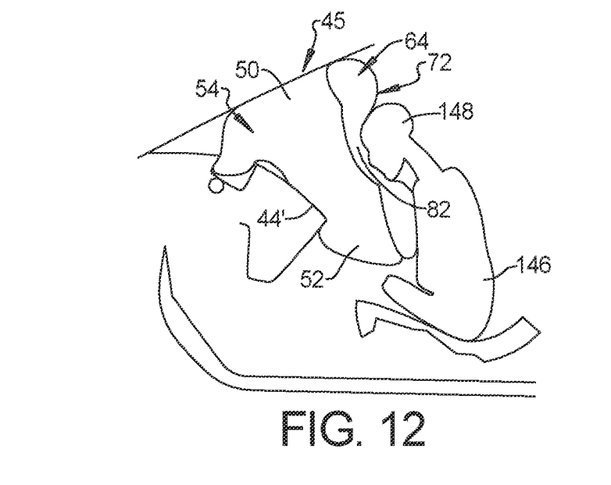
FIG. 12 is a cross-sectional side elevational view modified from FIG. 3B to further include a 50th percentile occupant at 50 msec into an airbag deployment event.

Referring to FIG. 12 and again to FIGS. 3B, 4 and 10 through 11, an occupant 146 representing a $50^{th}$ percentile occupant by weight is shown at approximately 50 msec into an airbag deployment event. A head 148 of the occupant 146 initially contacts the outer occupant facing wall 72 of the secondary airbag chamber 64. The occupant head 148 has partially collapsed the secondary airbag chamber 64 approximately retaining the chamber region 82 of the secondary airbag chamber 64. The primary airbag chamber 54 has partially collapsed but the occupant head 148 is entirely clear of the object 44'.

Figure 13:
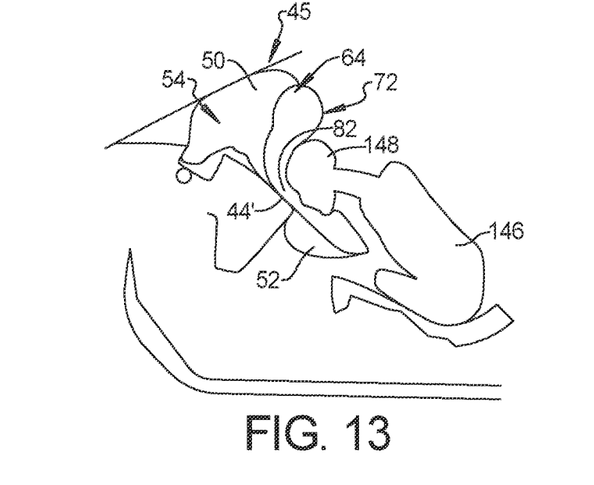
FIG. 13 is a cross-sectional side elevational view modified from FIG. 12 to include the $50^{th}$ percentile occupant at 80 msec into the airbag deployment event.

Referring to FIG. 13 and again to FIGS. 3B, 4 and 10 through 12, the occupant 146 is shown at approximately 80 msec into the airbag deployment event. The occupant head 148 has partially collapsed the secondary airbag chamber 64 retaining the chamber region 82 of the secondary airbag chamber 64. The primary airbag chamber 54 has partially collapsed but the occupant head 148 is spaced from the object 44' by a width of the chamber region 82 of the secondary airbag chamber 64.

Referring to FIG. 14 and again to FIG. 3B, according to several aspects an airbag assembly 150 is modified from the one-way multiple cushions and chambers airbag assembly 45, with components similar to the one-way multiple cushions and chambers airbag assembly 45 indicated by an apostrophe symbol. The airbag assembly 150 includes an airbag body 152 having a first chamber portion 154 and a second chamber portion 156. The first chamber portion 154 and the second chamber portion 156 together define a first or primary airbag chamber 158. A tether 160 is substantially centrally positioned within the airbag body 152 and may extend from a 162 to a gas fill inlet 164. The first chamber portion 154 and the second chamber portion 156 are in fluid communication as the tether 160 acts to internally structurally stiffen the airbag body 152 when the airbag body 152 is fully inflated as shown and provides substantially no separation of the gas in the first chamber portion 154 and the second chamber portion 156.

Figure 14:
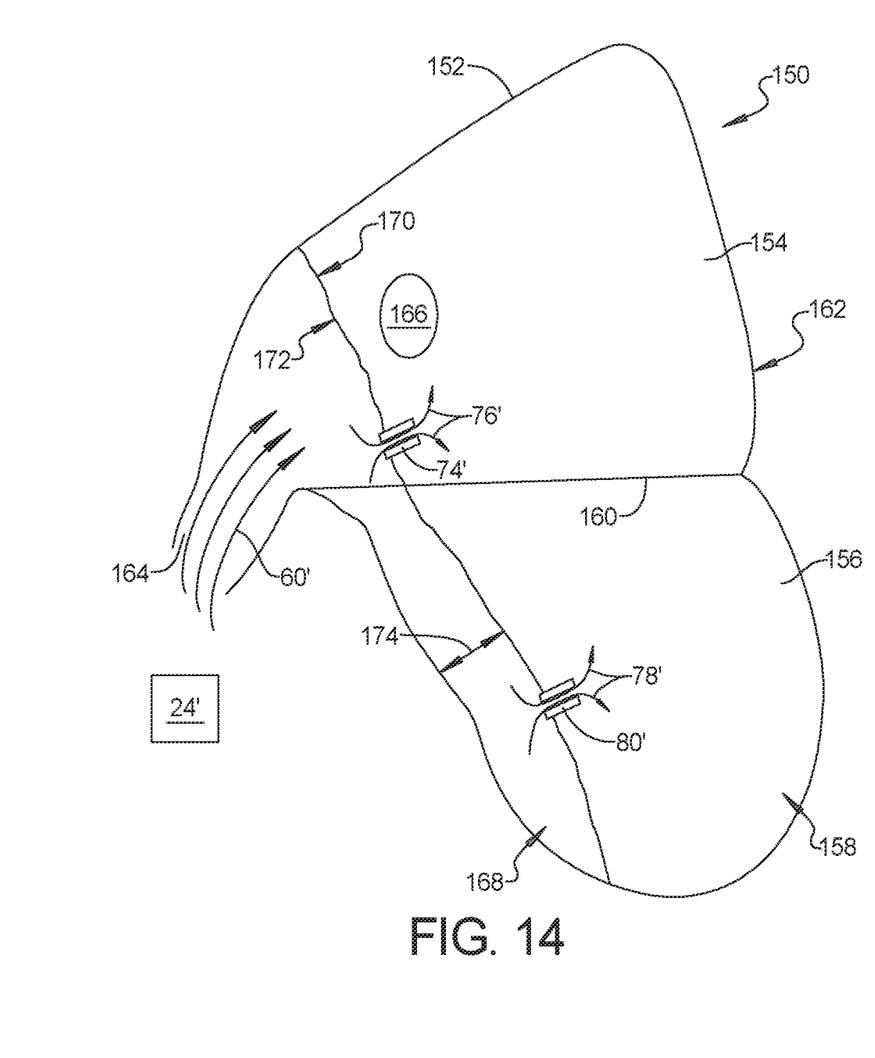
FIG. 14 is a cross-sectional side elevational view modified from FIG. 3B to include another aspect of an airbag assembly.

The airbag body 152 deflates following a collision event by allowing the gas 60' to flow outwardly from the first chamber portion 154 and the second chamber portion 156 through a vent hole 166. The vent hole 166 is sized to allow deflation of the airbag body 152. In addition to the primary airbag chamber 158, the airbag body 152 further includes a secondary airbag chamber 168. A connecting wall 170 of the primary airbag chamber 158 creates an inner face 172 of the secondary airbag chamber 168. When fully inflated the secondary airbag chamber 168 defines a supplementary cushion volume 174 which is retained during initial collapse of the primary airbag chamber 158. The secondary airbag chamber 168 is therefore oppositely positioned with respect to the secondary airbag chamber 64 of the one-way multiple cushions and chambers airbag assembly 45.

The gas fill inlet 164 opens into the secondary airbag chamber 168 supplying a flow of the gas 60' under pressure used to first fill the secondary airbag chamber 168 and then fill the primary airbag chamber 158 of the airbag body 152.

The gas 60' is supplied from a gas generator such as the pyrotechnic device 24' located adjacent to and outside of the airbag body 152. As the gas 60' enters the secondary airbag chamber 168 the gas 60' flows toward the inner face 172 of the secondary airbag chamber 168 and enters the first one-way vent valve 74' which penetrates the connecting wall 170 allowing a first portion of the gas 60' as the gas flow 76' into the primary airbag chamber 158. According to several aspects the second one-way vent valve 78' also penetrates the connecting wall 170 allowing a second portion of the gas 60' as the gas flow 80' to enter the primary airbag chamber 158. According to several aspects, the first one-way vent valve 74' and the second one-way vent valve 78' as configured in the airbag assembly 150 individually provide a gas interconnection passage between the secondary airbag chamber 64 and the primary airbag chamber 54.

During deflation of the airbag body 152, the gas 60' in the primary airbag chamber 158 flows outwardly from the first chamber portion 154 and the second chamber portion 156 through the vent hole 166. The gas 60' then exits the secondary airbag chamber 168 in the same direction of flow between the secondary airbag chamber 168 toward the primary airbag chamber 158 as shown by the gas flow 76' and the gas flow 80'. Similar to the one-way multiple cushions and chambers airbag assembly 45, the first one-way vent valve 74' and the second one-way vent valve 78' restrict exiting gas flow from the secondary airbag chamber 168 to maintain the supplementary cushion volume 174 during the collision event and the airbag deployment event.

According to several embodiments, the secondary airbag chamber 64, 168 is a non-leakage chamber that will be inflated along with the primary airbag chamber 54, 158 and the secondary airbag chamber 64, 168 exhibits no or little leakage during the airbag deployment event through the end of the motion of the occupant during the collision event. The secondary airbag chamber 64, 168 provides additional protection for higher severity impacts or for heavier occupants and mitigates against the airbag body bottoming out while providing a retained cushion to absorb impact energy.

The airbag assemblies of the present disclosure cushion can be applied to all the current airbag designs including driver airbags, passenger airbags, side impact airbags, and front center airbags. The secondary air cushions of the present disclosure can hold an inflated airbag pressure longer inside the airbag body and have little or no leakage of air pressure while the primary chamber is deflating. With the smaller and stiffer secondary cushions, the occupant may be further protected when the primary airbag is losing its pressure and near bottoming out. Using the secondary airbag chamber of the present disclosure, the airbag body can maintain its contacting surface with the occupant's head during airbag deflation and thereby reduce upward forces acting on the occupant's chin which could otherwise induce a larger neck bending moment.

With an additional pocket cushion inside the airbag, the airbag and the occupant maintain a better contact surface along the airbag surface and thereby reduce a neck load when the airbag has too much contact surface under the chin of ATD. The secondary airbag chamber will inflate along with the primary airbag chamber and the secondary airbag chamber exhibits no or little leakage. The secondary airbag chamber will therefore provide additional protection for higher severity impact events or for heavier occupants and prevent the airbag from bottoming out while providing a cushion to absorb impact energy.

A one-way multiple cushions and chambers airbag assembly of the present disclosure offers several advantages. These include a secondary and no-leakage chamber which will be inflated along with the primary chamber and the secondary chamber will have none or little leakage. The secondary chamber provides additional protection for higher severity impacts or for a heavier occupant and prevents the airbag from bottoming out while also providing a soft cushion to absorb impact energy.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A one-way multiple cushions and chambers vehicle airbag assembly, comprising:
   an airbag body having a primary airbag chamber and a secondary airbag chamber; and
   at least one one-way vent valve providing a gas interconnection passage between the primary airbag chamber and the secondary airbag chamber,
   wherein the at least one one-way vent valve includes a first one-way vent valve and a second one-way vent valve individually having a stitched border providing stiffness to maintain an opening port to allow gas flow through the first one-way vent valve and the second one-way vent valve during deflation of the airbag body.

2. The one-way multiple cushions and chambers vehicle airbag assembly of claim 1, including a connecting wall positioned between and separating the primary airbag chamber and the secondary airbag chamber, the connecting wall defining a substantially impermeable barrier to gas transfer between the secondary airbag chamber and the primary airbag chamber when the airbag is inflated during an airbag deployment event.

3. The one-way multiple cushions and chambers vehicle airbag assembly of claim 2, wherein the at least one one-way vent valve extends through the connecting wall.

4. The one-way multiple cushions and chambers vehicle airbag assembly of claim 2, wherein when fully inflated with a gas during the airbag deployment event the secondary airbag chamber defines a supplementary cushion volume bounded between the connecting wall and an outer occupant facing wall.

5. The one-way multiple cushions and chambers vehicle airbag assembly of claim 2, wherein the at least one one-way vent valve penetrates the connecting wall allowing a first portion of a gas filling the airbag body during the airbag deployment event to be directed from the primary airbag chamber into the secondary airbag chamber.

6. The one-way multiple cushions and chambers vehicle airbag assembly of claim 2, wherein the at least one one-way vent valve penetrates the connecting wall allowing a first portion of a gas filling the airbag body during the airbag deployment event to be directed from the secondary airbag chamber into the primary airbag chamber.

7. The one-way multiple cushions and chambers vehicle airbag assembly of claim 1, wherein the primary airbag chamber includes a first chamber portion and a second chamber portion in open fluid communication.

8. The one-way multiple cushions and chambers vehicle airbag assembly of claim 7, including a tether positioned between the first chamber portion and the second chamber portion, wherein the first chamber portion and the second chamber portion together define the primary airbag chamber.

9. The one-way multiple cushions and chambers vehicle airbag assembly of claim 1, further including a vent hole positioned in the primary airbag chamber to vent the primary airbag chamber to atmosphere following an airbag deployment event.

10. A one-way multiple cushions and chambers vehicle airbag assembly, comprising:
- an airbag body having a primary airbag chamber and a secondary airbag chamber, the airbag body connected to a source of a gas used to inflate the airbag body during an airbag deployment event;
- a connecting wall between the primary airbag chamber and the secondary airbag chamber; and
- first and second one-way vent valves penetrating the connecting wall and individually providing a gas interconnection passage between the primary airbag chamber and the secondary airbag chamber allowing a primary flow of the gas from one of the primary airbag chamber and the secondary airbag chamber into the other one of the primary airbag chamber and the secondary airbag chamber during the airbag deployment event.

11. The one-way multiple cushions and chambers vehicle airbag assembly of claim 10, wherein the connecting wall defines a substantially impermeable barrier to gas transfer between the secondary airbag chamber and the primary airbag chamber.

12. The one-way multiple cushions and chambers vehicle airbag assembly of claim 10, wherein the first one-way vent valve and the second one-way vent valve do not preclude but restrict a reverse flow of the gas back into the primary airbag chamber, allowing the secondary airbag chamber to deflate after the airbag deployment event slower than a deflation rate of the primary airbag chamber.

13. The one-way multiple cushions and chambers automobile vehicle airbag assembly of claim 10, wherein the connecting wall defines an outer face of the primary airbag chamber.

14. The one-way multiple cushions and chambers vehicle airbag assembly of claim 10, wherein the connecting wall defines an outer face of the secondary airbag chamber.

15. The one-way multiple cushions and chambers vehicle airbag assembly of claim 10, wherein the first and second one-way vent valves individually include:
- a first edge wall having a first wall thickness;
- a second edge wall oppositely positioned with respect to the first edge wall having a second wall thickness greater than the first wall thickness to permit the first edge wall to collapse more easily than the second edge wall; and
- a first height of the first edge wall being shorter than a second height of the second edge wall to control a collapse direction of the first and second one-way vent valves.

16. The one-way multiple cushions and chambers vehicle airbag assembly of claim 10, wherein the first and second one-way vent valves individually include:
- opposing wall edges having an equal thickness; and
- an opening port having a stitched border providing stiffness to maintain the opening port open during collapse of the first and second one-way vent valves when the airbag body deflates.

17. A method for inflating multiple cushions and chambers of a vehicle airbag assembly, comprising:
- positioning a connecting wall between a primary airbag chamber and a secondary airbag chamber of an airbag body;
- extending first and second one-way vent valves through the connecting wall to individually provide a gas interconnection passage between the primary airbag chamber and the secondary airbag chamber; and
- configuring the airbag body to receive a gas into the airbag body including the primary airbag chamber and the secondary airbag chamber with a primary flow of the gas directed through the first and second one-way vent valves from one of the primary airbag chamber and the secondary airbag chamber into the other one of the primary airbag chamber and the secondary airbag chamber during an airbag deployment event.

18. The method for inflating multiple cushions and chambers of the vehicle airbag assembly of claim 17, further including:
- configuring the airbag body having the secondary airbag chamber directed toward an occupant of the vehicle during inflation of the airbag body to use the secondary airbag chamber as a cushion for a head of the occupant; and
- selectively arranging the primary flow of the gas from the primary airbag chamber into the secondary airbag chamber to permit the secondary airbag chamber to deflate slower than the primary airbag chamber to maintain at least a portion of the cushion to remain between the head of the occupant and structure of the vehicle.

19. The method for inflating multiple cushions and chambers of the vehicle airbag assembly of claim 17, further including:
- configuring the airbag body having the primary airbag chamber directed toward an occupant of the vehicle during inflation of the airbag body to allow the primary airbag chamber to be first contacted by a head of the occupant; and
- selectively arranging the primary flow of the gas from the secondary airbag chamber into the primary airbag chamber having the secondary airbag chamber deflating slower than the primary airbag chamber to maintain at least a portion of the secondary airbag chamber to remain between the head of the occupant and a structure of the vehicle.

* * * * *